Patented Sept. 12, 1944

2,358,086

UNITED STATES PATENT OFFICE 2,358,086

FOOD PRODUCT AND PROCESS FOR MAKING THE SAME

Edward R. Mollner, Van Nuys, Joseph A. Weber, La Canada, and James T. Brennan, Van Nuys, Calif.

No Drawing. Application September 29, 1941, Serial No. 412,782

2 Claims. (Cl. 99—204)

This invention relates to food products and particularly to a dried or dehydrated food product, of which our preferred example is a preserved, sweetened and bleached dried apple product. Our invention is applicable to the treatment and preparation of various kinds of dried fruits, but for the sake of clarity and because the apple is one of the best examples of those fruits whose deficiencies we cure, we will refer specifically to dried apples in describing our product and process.

Dried or dehydrated apples do not contain sufficient natural sugar to make them palatable alone nor to preserve them to the same extent as other fruits whose natural sugar content is substantially greater. Moreover, the meat of the apple is readily discolored by moisture, and as there is approximately 25% moisture in ordinary commercial dried apples a certain amount of this moisture reaches the surface and tends to discolor the fruit, rendering it unattractive.

An object of this invention is to provide a new food product and process for making the same whereby dried or dehydrated fruit such as apples are treated in a manner to render the fruit more attractive in taste and appearance, impart added preserving qualities, and produce a food substance which requires only the addition of water in cooking to produce an apple sauce of fine flavor, spice or other flavoring being added to suit the taste.

A further object is to produce an apple food product in the form of coarse grains or pellets, in which the moisture is reduced to a minimum for preservative purposes, and which absorb and swell much more rapidly in water when being prepared for use than will ordinary dried or dehydrated apples.

Another object of the invention is to produce a food product of the character described in which the grains or pellets are coated with a digestible preservative substance of hydroscopic character which will protect the dried apple meat from external moisture and also tend to remove excess moisture from the fruit itself.

A further, more specific object is to incorporate in connection with the foregoing product and process the use of a bleach which will act upon the fruit primarily while it is curing under the coating process and prevent discoloration during such process.

A still further object of our invention is to improve the keeping qualities of a dried fruit product of the character described by further dehydrating the same after the coating and bleaching application.

Further objects and advantages will be made apparent from a further consideration of the description and the claims.

As an example of our invention we take dried apples or dehydrated apples in ordinary commercial form and by any suitable method and apparatus grind or chop them into coarse grains or pellets about the size of small peas. This size is not critical but is recommended. The grinding or chopping of the dried apples results in a substantial amount of moisture coming to the surface of the cut particles and if they remain untreated the meat will turn dark, stick together in a mass, and ferment. Further dehydrating would preserve them, but in their natural ground or chopped condition the apple particles would stick together as a mass and it has been found difficult if not impossible to properly dry the apple meat. It is desirable in the practice of our invention that each coarse grain or pellet of apple meat be individually further dehydrated. The desired result at the close of our process is to have each individual grain or pellet, which are preferably about the size of small peas, coated and dried to the point where they will be free from one another to the same substantial degree as dried peas or beans.

As the next step in our process after the grinding or chopping of the apples, we coat the grains or pellets wth a hydroscopic agent, a preferred example of which is as follows: Milk powder (from skim milk) 20 parts, dextrose 80 parts. These proportions may be varied by reducing the proportion of dextrose (refined corn sugar) to as low as an equal part with the skim milk powder, but we have found that the proportions indicated as preferable give the best results. The dextrose performs the two functions of keeping the particles of milk powder separated so that the powder will not lump in the presence of moisture, imparting the additional preservative qualities afforded by sugar, and sweetening the product, requiring only the addition of water and cooking to make a palatable apple sauce.

The milk powder which we use is the solid after the water has been removed from skim milk. Other hydroscopic foods in granulated or powdered form such as corn starch, soy bean flour, tapioca, wheat flour and corn flour may be substituted for the milk powder. The primary purpose is to utilize a palatable and digestible hydroscopic agent in powdered form.

As an equivalent of dextrose we may employ sucrose (cane or beet sugar), lactose (milk sugar), or powdered sugar (ground cane or beet sugar), or any other sweetening agent of similar characteristics reduced to powdered form or the form of fine grains.

The preservative coating heretofore described, whether the preferred example or in the form of equivalents, is applied to the surface of the grains or pellets of ground or chopped apple meat in any suitable or convenient manner. In small batches it may be done merely by mixing in a bowl. In commercial practice it is preferable to sift, dust or blow the powdered coating upon the apple particles, using a vibrating tray or other type of vibrating mixing machine to insure a complete covering of the grains or pellets by the coating, and at the same time facilitate the agitation of the coating by separating the grains or pellets.

There is no particular time factor involved in the treatment of the ground or chopped apple meat by the coating, it being preferable that the application of the coating commence promptly after the grinding or chopping of the apple meat and continuing until the coating is fully and properly applied.

In the preferred form of our invention we desire to incorporate in the coating powder approximately one part of a bleaching agent, a preferred example of which is as follows: 12½ parts sodium bisulphite, 87½ parts sodium chloride. These proportions may be varied but we prefer to retain any variation within three to four per cent.

The bleaching agent, which is in powder form, may be mixed with the milk powder and dextrose or substitutes therefor in an ordinary powder mixer or by any other suitable means prior to the application of the coating to the apple.

The bleaching agent keeps the apples in light color until the continued treatment as subsequently described has further dehydrated them. Otherwise the moisture coming to the surface would tend to discolor the apple meat. In the bleaching process the sodium bisulphite goes into solution forming sulphurous acid which is a preservative and which tends to bleach the color. The primary purpose of the salt as a part of the bleaching agent is to give bulk to facilitate handling. The salt could be eliminated, and in fact the entire bleaching agent could be eliminated as heretofore mentioned. However, we may under some circumstances use the sodium bisulphite alone as the bleaching agent.

Not by way of limitation but as an indication of the results noted in using our process the coating (including the bleach) which we apply preferably amounts to a minimum of 3% and a maximum of 15% of the total weight of the product before final dehydration which is to be subsequently described.

The next step in our process is to place the coated apple meat on a screen tray carrying it through a tunnel and maintaining a circulation of hot air through the tunnel in the opposite direction. We prefer to maintain a temperature in the tunnel of from 150° to 180° F. The time of dehydration may vary from two to ten hours depending upon the size of the grains or pellets, the thickness of the coating and the efficiency of the dryer. The dehydrating step may be performed in any other desirable or suitable manner, as for example by means of a rotary dryer or even an ordinary oven. It may be accomplished by drying in the sun, but for commercial practice it is preferable to use a traveling tray in a tunnel as first described.

The preferred dehydrating treatment will remove from 10% to 22% by weight of the moisture present in the ordinary commercial dried apple product, the ordinary moisture amounting to about 25% by weight as heretofore mentioned.

After the treatment of our product is completed the coated and dehydrated grains or pellets may be packaged in any desirable manner, as for example in cartons or paper bags. It is not necessary that the packages be hermetically sealed, as the product will retain its preserved condition indefinitely. When ready to use the product it is merely necessary to soak the grains or pellets a short time in water, and simmer slowly until tender. Sugar may be added if desired although it will be found that very little, if any, is required to make a palatable apple sauce. Spices or flavoring may also be added, but this is entirely optional with the user.

Although we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent products and processes.

Having described our invention, what we claim as new and desire to secure by Letters Patent is:

1. A process of preserving dried apples and preparing them for cooking comprising the steps of: grinding the dried apples into coarse particles, coating the ground apple particles at room temperature with a dry powdery mixture comprising approximately 20 parts of milk powder, 80 parts of dextrose, and 1 part of a bleaching agent the latter comprising approximately 12½ parts of sodium bisulphite and 87½ parts of sodium chloride, and dehydrating the coated fruit particles to remove approximately from 10% to 22% by weight of the moisture remaining in the coated fruit particles.

2. A food product comprising: dehydrated dried apples in the form of hard pellets permanently deprived of surface adhesion characteristics in atmosphere each pellet comprising a core of dehydrated dried apple coated with a hardened layer of milk powder and dextrose forming a crust around said core, and said pellets being convertible into applesauce by soaking in water and cooking.

EDWARD R. MOLLNER.
JOSEPH A. WEBER.
JAMES T. BRENNAN.